United States Patent
Kawamoto (10) Patent No.: US 7,206,002 B2
(45) Date of Patent: Apr. 17, 2007

(54) IMAGE PROCESSING APPARATUS AND METHOD THAT AVOID GENERATION OF MOIRE

(75) Inventor: Hiroyuki Kawamoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 43 days.

(21) Appl. No.: 10/305,102

(22) Filed: Nov. 27, 2002

(65) Prior Publication Data

US 2003/0122825 A1 Jul. 3, 2003

(30) Foreign Application Priority Data

Nov. 30, 2001 (JP) .................................... 2001-367702
Nov. 26, 2002 (JP) .................................... 2002-342093

(51) Int. Cl.
 G09G 3/36 (2006.01)

(52) U.S. Cl. ................... 345/673; 345/63; 345/611; 345/619; 345/668; 345/77; 382/237; 382/260; 382/265; 382/272

(58) Field of Classification Search .............. 345/63, 345/77, 611, 619, 668, 673; 358/298, 456, 358/458, 534; 382/237, 260, 265, 272
See application file for complete search history.

(56) References Cited

U.S. PATENT DOCUMENTS

| | | | |
|---|---|---|---|
| 4,987,496 A | | 1/1991 | Greivenkamp, Jr. |
| 5,387,983 A | | 2/1995 | Sugiura et al. |
| 5,513,016 A | | 4/1996 | Inoue |
| 5,608,824 A | * | 3/1997 | Shimizu et al. ............. 382/276 |
| 6,118,547 A | * | 9/2000 | Tanioka ...................... 358/1.9 |
| 6,151,457 A | | 11/2000 | Kawamoto |
| 6,319,682 B1 | * | 11/2001 | Hochman ................... 435/29 |
| 6,486,971 B1 | | 11/2002 | Kawamoto |
| 2001/0012113 A1 | | 8/2001 | Yoshizawa et al. |
| 2001/0012127 A1 | | 8/2001 | Fukuda et al. |
| 2001/0015821 A1 | | 8/2001 | Namizuka et al. |
| 2001/0019429 A1 | | 9/2001 | Oteki et al. |
| 2001/0021278 A1 | | 9/2001 | Fukuda et al. |
| 2001/0050778 A1 | | 12/2001 | Fukuda et al. |
| 2001/0054126 A1 | | 12/2001 | Fukuda et al. |
| 2002/0012131 A1 | | 1/2002 | Oteki et al. |
| 2002/0018244 A1 | | 2/2002 | Namizuka et al. |
| 2002/0027670 A1 | | 3/2002 | Takahashi et al. |
| 2002/0054374 A1 | | 5/2002 | Inoue et al. |
| 2002/0191694 A1 | | 12/2002 | Ohyama et al. |
| 2002/0196470 A1 | | 12/2002 | Kawamoto et al. |

FOREIGN PATENT DOCUMENTS

EP 0-579-177 A2 1/1994

OTHER PUBLICATIONS

Tai–Yi Chao, et al., "Inverse Halftoning of Scanned Images", IEEE, 1995, pp. 420–423.
Anil K. Jain; "Fundamentals of Digital Image Processing", 1988, pp. 253–255, Prentice Hall International London, ISBN: 0–13–332578–4.*

* cited by examiner

Primary Examiner—Bipin Shalwala
Assistant Examiner—Vincent E. Kovalick
(74) Attorney, Agent, or Firm—Dickstein Shapiro Morin & Oshinsky LLP (57) ABSTRACT

An image processing apparatus includes a spatial filtering unit which applies spatial filtering to input image data to generate filtered image data such that the spatial filtering provides a broader dynamic range for outputs than for inputs, and a high-resolution conversion unit which interpolates the filtered image data in a first direction by an average of values of two pixels adjacent in the first direction, in a second direction perpendicular to the first direction by an average of values of two pixels adjacent in the second direction, and in a direction diagonal to the first and second directions by an average of four pixels surrounding a pixel of interest, thereby converting the filtered image data into high-resolution image data.

11 Claims, 9 Drawing Sheets

| [A] | a1 | [B] | b1 |
| a2  | a3 | b2  | b3 |
| [C] | c1 | [D] | d1 |
| c2  | c3 | d2  | d3 |

| FIRST LINE | a |
| SECOND LINE | b |
| THIRD LINE | c |
| FOURTH LINE | b |
| FIFTH LINE | a |

FIG.8B

| FIRST LINE | a | |
| SECOND LINE | b | a |
| THIRD LINE | c | b |
| FOURTH LINE | b | c |
| FIFTH LINE | a | b |
| SIXTH LINE | | a |

FIG.8C

| FIRST LINE | -1 | |
| SECOND LINE | 2 | -1 |
| THIRD LINE | 6 | 2 |
| FOURTH LINE | 2 | 6 |
| FIFTH LINE | -1 | 2 |
| SIXTH LINE | | -1 |

IMAGE PROCESSING APPARATUS AND METHOD THAT AVOID GENERATION OF MOIRE

BACKGROUND OF THE INVENTION

1. Field of the Invention

The present invention generally relates to image processing apparatuses, and particularly relates to an image processing apparatus which reduces moiré that is generated when a screen dot image is scanned as an input document.

2. Description of the Related Art

In digital copiers, moiré (density fluctuation) appears when a screen dot document is input, resulting in the degradation of image quality. Factors that cause moiré include 1) interference between the screen dot pitches of the document and the sampling interval at the time of image scans that generate each pixel value, and 2) non-linier processing such as the saturation of density levels caused by spatial filtering or steep changes in input/output values caused by γ processing.

A method that suppresses the generation of moiré caused by the first factor includes blurring the input image data by use of a smoothing filter. A method that suppresses the generation of moiré caused by the second factor includes employing weak spatial filtering so as to avoid the saturation of image data or employing smooth γ processing.

The related-art methods as described above can properly reduce moiré relating to a screen dot image, but gives rise to a problem in that line drawings such as letters are blurred so as to result in the degradation of image resolution and sharpness. It is possible to obtain images having less moiré by increasing the sampling interval used at the time of image scans. This creates a problem, however, in that a CCD-based scanning device having high resolution is necessary, thereby increasing costs.

Accordingly, there is a need for an image processing apparatus that can effectively suppress moiré relating to a screen dot image.

SUMMARY OF THE INVENTION

It is a general object of the present invention to provide an image processing apparatus and a method of processing an image that substantially obviate one or more of the problems caused by the limitations and disadvantages of the related art.

Features and advantages of the present invention will be set forth in the description which follows, and in part will become apparent from the description and the accompanying drawings, or may be learned by practice of the invention according to the teachings provided in the description. Objects as well as other features and advantages of the present invention will be realized and attained by image processing apparatuses particularly pointed out in the specification in such full, clear, concise, and exact terms as to enable a person having ordinary skill in the art to practice the invention.

To achieve these and other advantages and in accordance with the purpose of the invention, as embodied and broadly described herein, the invention provides an image processing apparatus includes a spatial filtering unit which applies spatial filtering to input image data to generate filtered image data such that the spatial filtering provides a broader dynamic range for outputs than for inputs, and a high-resolution conversion unit which interpolates the filtered image data in a first direction by an average of values of two pixels adjacent in the first direction, in a second direction perpendicular to the first direction by an average of values of two pixels adjacent in the second direction, and in a direction diagonal to the first and second directions by an average of four pixels surrounding a pixel of interest, thereby converting the filtered image data into high-resolution image data.

In the image processing apparatus as described above, the spatial filtering that provides a broader dynamic range for outputs is employed to avoid non-linear processing, and, then, the filtered image data is converted into high-resolution image data. With this provision, subsequent non-linear processing such as limiting the dynamic range to the original range can be performed without having moiré typically generated by non-linear processing. Further, when the image data is interpolated to generate high-resolution image data, two pixels adjacent in the first direction are averaged for use in interpolation regarding the first direction, and two pixels adjacent in the second direction are averaged for use in interpolation regarding the second direction. Further, four pixels surrounding a pixel of interest are averaged for use in interpolation regarding the diagonal direction. With this provision, it is possible to reduce the amount of computation required for the conversion of image resolution, and also to reduce the number of FIFO memories used for the conversion of image resolution. Accordingly, hardware having a small-size configuration achieves both the prevention of moiré and the generation of high-quality letter images.

Further, the present invention provides a method of processing an image as performed by the image processing apparatus described above.

According to another aspect of the present invention, the image processing apparatus as described above is constructed such that the spatial filtering unit includes a plurality of filter circuits, the plurality of filter circuits applying spatial filtering concurrently to a plurality of lines of the input image data, so as to generate a plurality of the filtered image data concurrently that are spaced apart in the second direction by a predetermined number of lines, the plurality of the filtered image data being supplied to the high-resolution conversion unit.

According to the construction described above, a plurality of filter circuits are provided, which concurrently generate respective image data that are spaced apart in the second direction by such a number of lines as necessary for the conversion of image resolution. This reduces the size of FIFO memories that is necessary for the conversion of image resolution.

According to further aspect of the present invention, the image processing apparatus as described above is such that a first filter circuit of the plurality of filter circuits multiplies a line of the input image data by a first filter coefficient, and a second filter circuit of the plurality of filter circuits multiplies the line of the input image data by a second filter coefficient by utilizing a result of the multiplication by the first filter circuit.

According to the image processing apparatus described above, when a plurality of filter circuits are operated on the same single line, provision is made such that an operation result of a given filter circuit can be obtained from an operation result of another filter circuit. This allows the plurality of filter circuits to operate concurrently without having a proportionate increase in the amount of processing in commensurate with the number of filter circuits.

According to another aspect of the present invention, an image processing apparatus includes a high-resolution conversion unit which interpolates input image data in a first direction by an average of values of two pixels adjacent in the first direction, in a second direction perpendicular to the first direction by an average of values of two pixels adjacent in the second direction, and in a direction diagonal to the first and second directions by an average of four pixels surrounding a pixel of interest, thereby converting the input image data into high-resolution image data, and a spatial filtering unit which applies spatial filtering to the high-resolution image data.

In the information processing apparatus as described above, the input image data is converted into the high-resolution image data first, and, then, the filtering operation with data saturation that is non-linear processing is performed. This suppresses the generation of moiré caused by non-linear processing. Further, when the image data is interpolated to generate the high-resolution image data, two pixels adjacent in the first direction are averaged for use in interpolation regarding the first direction, and two pixels adjacent in the second direction are averaged for use in interpolation regarding the second direction. Further, four pixels surrounding a pixel of interest are averaged for use in interpolation regarding the diagonal direction. With this provision, it is possible to reduce the amount of computation required for the conversion of image resolution, and also to reduce the number of FIFO memories used for the conversion of image resolution. Accordingly, hardware having a small-size configuration achieves both the prevention of moiré and the generation of high-quality letter images.

Other objects and further features of the present invention will be apparent from the following detailed description when read in conjunction with the accompanying drawings.

DESCRIPTION OF THE PREFERRED EMBODIMENTS

In the following, embodiments of the present invention will be described with reference to the accompanying drawings.

First Embodiment

Figure 1:
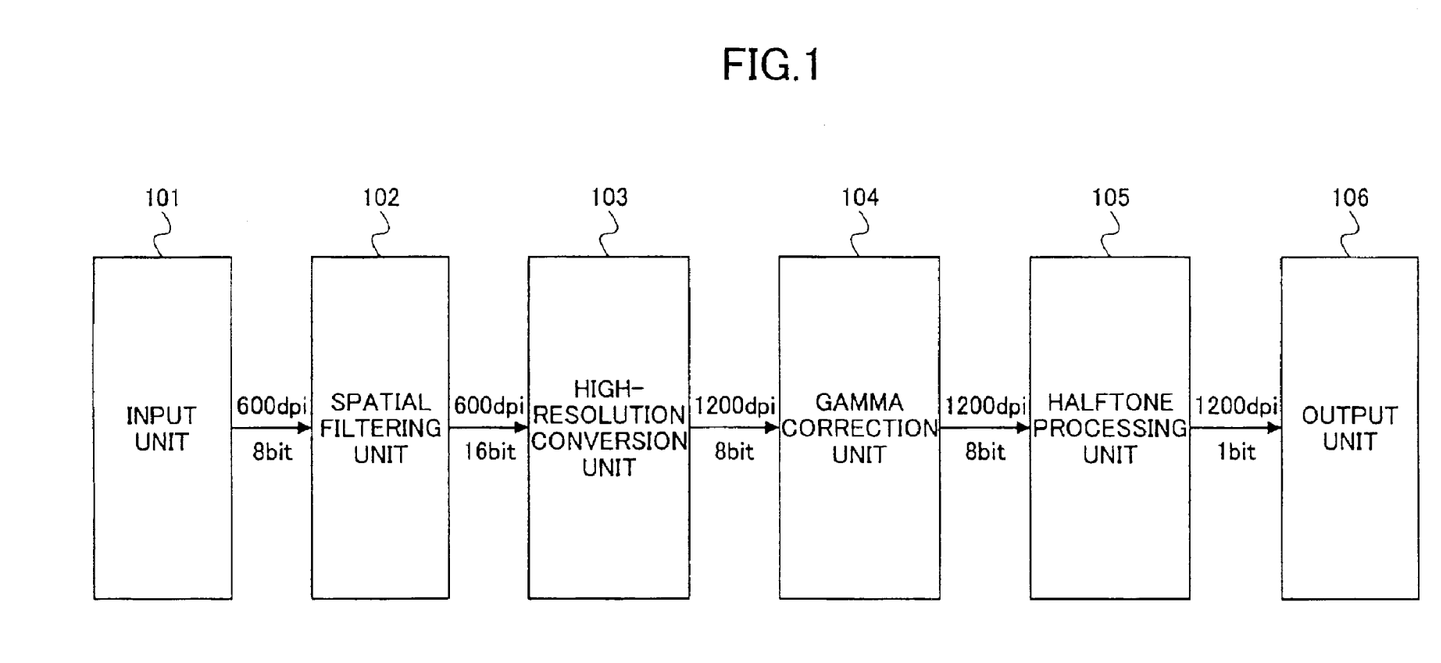
FIG. 1 is a block diagram showing a schematic configuration of an image processing apparatus according to the first embodiment of the present invention.

FIG. 1 is a block diagram showing a schematic configuration of an image processing apparatus according to the first embodiment of the present invention.

The image processing apparatus of FIG. 1 includes an input unit 101, a spatial filtering unit 102, a high-resolution conversion unit 103, a gamma correction unit 104, a halftone processing unit 105, and an output unit 106. The input unit 101 obtains image data by scanning a document. The spatial filtering unit 102 applies spatial filtering to the image data such that the spatial filtering provides a broader dynamic range. The high-resolution conversion unit 103 changes image resolution to higher image resolution by interpolating the image data processed by the spatial filtering unit 102. The gamma correction unit 104 applies gamma correction to the image data that is given higher resolution by the high-resolution conversion unit 103. The halftone processing unit 105 applies halftone processing to the image data that has undergone gamma correction by the gamma correction unit 104. The output unit 106 outputs image data on a paper sheet or the like after the halftone processing by the halftone processing unit 105.

The image processing apparatus of FIG. 1 may be a copier machine. In this case, the input unit corresponds to the image scanner that optically scans a document image, and the output unit corresponds to the image formation unit that creates an image of the scanned document on a photosensitive drum or the like, develops the image, and transfers the image onto a paper sheet, followed by fixing the image on the paper sheet. The image processing apparatus of FIG. 1 may be a computer to which a scanner and a printer are connected. In this case, the input unit corresponds to the scanner that optically scans a document, and the portion that performs subsequent image processing corresponds to the computer. Further, the output unit corresponds to the printer that generates a printout of an output image. In such a configuration, the image processing apparatus of the present invention may be regarded as the portion that performs actual image processing, i.e., a portion that excludes the input unit 101 and the spatial filtering unit 102, and includes the spatial filtering unit 102, the high-resolution conversion unit 103, the gamma correction unit 104, and the halftone processing unit 105. Alternatively, the image processing apparatus of the present invention may be provided as a board carrying an ASIC (application specific integrated circuit) or the like, which implements the image processing portion of FIG. 1 (the spatial filtering unit 102, the high-resolution conversion unit 103, the gamma correction unit 104, and the halftone processing unit 105). Such a board may be used as an optional functional extension to a copier machine.

The input unit 101 includes a 600-dpi/8-bit scanner (i.e., having a 600 dpi resolution and 8-bit image levels per dot). The input unit 101 scans the image data of a document, and supplies 600-dpi/8-bit image data to the spatial filtering unit 102.

The spatial filtering unit 102 performs spatial filtering inclusive of MTF (modulation transfer function) correction such as edge sharpening. In detail, the spatial filtering unit 102 applies spatial filtering to the 600-dpi/8-bit image data supplied from the input unit 101 such that the spatial filtering provides a broader dynamic range for output values (16 bits) than for input values (8 bits). The spatial filtering unit 102 thus supplies 600-dpi/16-bit image data to the high-resolution conversion unit 103.

In general, spatial filtering is performed as having the same dynamic range for both input values and output values (i.e., the same number of image levels). If the input/output dynamic range is the same and 8 bits, for example, the image levels ranges from 0 to 255, and the number of image levels is 256. When spatial filtering having such configuration is applied, the resulting values may go below 0 or go above 255. Since the output values have to be limited to the range between 0 and 255, values below 0 or above 255 will be truncated.

The spatial filtering unit 102 according to the present invention insures that such truncation does not occur, i.e., insures that saturation at the upper end and lower end of the image levels does not occur. To this end, the spatial filtering unit 102 provides an output dynamic range (i.e., the number of image levels) that is sufficiently wider (e.g., 16 bits) than the input dynamic range (e.g., 8 bits). This suppresses moiré caused by non-linear processing.

A further explanation may be helpful to facilitate understanding. Non-linear processing such as spatial filtering with saturation generally generates harmonic components in the frequency domain in addition to the frequency components of an original image. Where the sampling interval in the input image is not sufficiently short, the harmonic components act as aliasing errors in the frequency domain. The aliasing error components interfere with the sampling interval, thereby generating moiré that results from non-linear processing. Provision of a sufficiently broad output dynamic range (i.e., the large number of image levels) such as provided by the spatial filtering unit 102 eliminates saturation, thereby suppressing moiré caused by non-linear processing.

The high-resolution conversion unit 103 changes image resolution and restricts the dynamic range with respect to the 600-dpi/16-bit image data supplied from the spatial filtering unit 102. As a result, the high-resolution conversion unit 103 supplies 1200-dpi/8-bit image data to the gamma correction unit 104.

In general, image data includes a black level and a white level reflecting the characteristics of the print/display medium, so that the data values are limited by an upper end and a lower end. In order to insure that the white level and black level of an input image are output as a white level and a black level in the output image, respectively, values of image data need to be restricted to a range that is represented by a proper number of bits such as 8 bits. Namely, it is necessary to limit the broader dynamic range comprised of 16 bits to the 8 bit range after this broader dynamic range is provided by the spatial filtering unit 102.

If the 16-bit broader dynamic range is changes to the 8-bit dynamic range in a straightforward manner, the resulting image will be the same as that obtained when the spatial filtering unit 102 is applied by providing only 8 bits for output values. This undermines the original intention that led to the use of the broader dynamic range. In the high-resolution conversion unit 103 of the present invention, thus, interpolation processing is performed to change 600-dpi image data to 1200-dpi image data, followed by limiting the range of image data to the 8-bit range.

A further explanation may be helpful to facilitate understanding. As previously described, moiré caused by non-linear processing is generated by interference between aliasing error components and the sampling interval. Conversion of image data into hither-resolution image data through interpolation as described above creates an effect that is equivalent to the effect of shortening of the sampling interval. Even when harmonic components are generated, therefore, the effect of aliasing errors in the frequency domain diminishes. Accordingly, when the 16-bit dynamic range is limited to the 8-bit dynamic range after the conversion of image resolution into higher resolution, the effect of aliasing errors caused by harmonic components is not so significant, thereby generating an image with less moiré.

The gamma correction unit 104 applies gamma conversion to the 1200-dpi/8-bit image data supplied from the high-resolution conversion unit 103, and supplies the 1200-dpi/8-bit image data to the halftone processing unit 105.

The halftone processing unit 105 performs halftone processing on the 1200-dpi/8-bit image data transferred from the gamma correction unit 104 so as to binarize the image data, thereby providing 1200-dpi/1-bit image data to the output unit 106. Although binarization is employed in this example, conversion into multi-value data may alternatively be performed.

The output unit 106 includes a printer unit, and prints the 1200-dpi/1-bit image data on a paper sheet when the image data is supplied from the halftone processing unit 105.

In the following, processing by the spatial filtering unit 102 and the high-resolution conversion unit 103 will be described. FIG. 2 through FIG. 5 will be referred to first, to describe the detail of processing that is performed by the high-resolution conversion unit 103. As previously described, the high-resolution conversion unit 103 converts 600-dpi image data into 1200-dpi image data.

Figure 2:
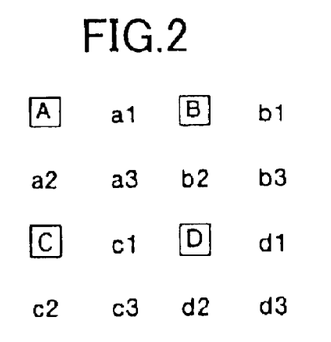
FIG. 2 is an illustrative drawing showing an example of a 4-x-4 image data.
Figure 4A:
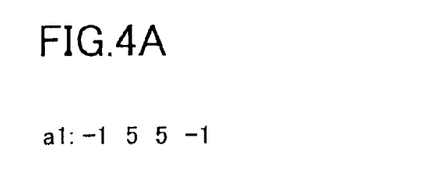
FIGS. 4A through 4C are illustrative drawings showing filter coefficients for converting image resolution into higher resolution that are used in the related-art system.

FIG. 2 is an illustrative drawing showing an example of a 4-×-4 image data. With reference to FIG. 4, a method of converting 600-dpi image data into 1200-dpi image data will be described in detail. In FIG. 4, A, B, C, and D designate values of 600-dpi pixels, and a1, a2, a3, b1, b2, b3, c1, c2, c3, d1, d2, and d3 designate values of interpolated pixels that are used to generate 1200-dpi image data.

The high-resolution conversion unit 103 generates the interpolated pixel values a1, a2, and a3 from the 600-dpi pixel values A, B, C, and D by using the following equations.

$$a1=(A+B)/2 \qquad (1)$$

$$a2=(A+C)/2 \qquad (2)$$

$$a3=(A+B+C+D)/4 \qquad (3)$$

As shown in the equation (1), the pixel value interpolated in the main scan direction is an average of two pixel values adjacent in the main scan direction. As shown in equation (2), the pixel value interpolated in the sub-scan direction is an average of two pixel values adjacent in the sub-scan direction. The pixel value interpolated in a diagonal direction is an average of four pixels surrounding the pixel of interest as shown in the equation (3).

Figure 3A:
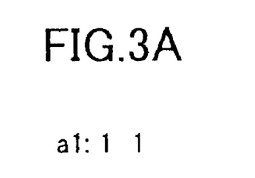
FIGS. 3A through 3C are illustrative drawings showing examples of filter coefficients of a high-resolution conversion unit.
Figure 3B:
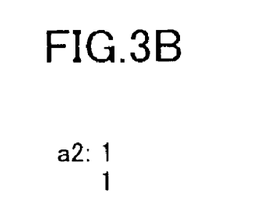
Figure 3C:
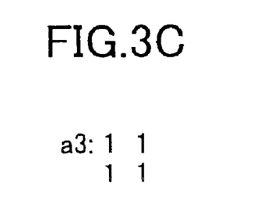

If the above computation is regarded as filtering computation, filter coefficients as shown in FIGS. 3A through 3C are obtained. FIGS. 3A through 3C are illustrative drawings showing examples of filter coefficients of the high-resolution conversion unit 103. FIG. 3A shows the filter in the main scan direction, FIG. 3B the filter in the sub-scan direction, and FIG. 3C the filter in the diagonal direction.

Figure 4B:
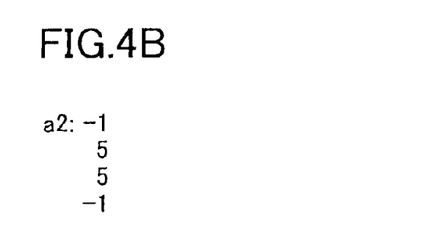
Figure 4C:
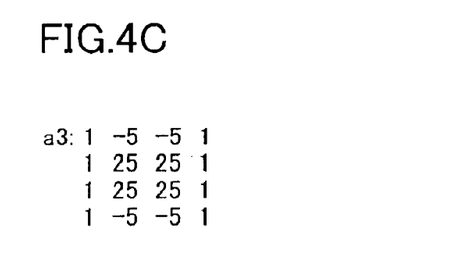

FIGS. 4A through 4C are illustrative drawings showing filter coefficients for converting image resolution into higher resolution that are used in the related-art system. Related-art multi-rate filters employ the filter coefficients as shown in FIGS. 4A through 4C. FIG. 4A shows the filter in the main scan direction, FIG. 4B the filter in the sub-scan direction, and FIG. 4C the filter in the diagonal direction Conversion into higher image resolution can be generalized as a smoothing filter by inserting "0"s into original data. In particular, conversion from 600 dpi to 1200 dpi is equivalent to the application of a smoothing filter by inserting "0"s at every other position in the original data. With respect to the example of the related-art multi-rate filter, smoothing filter coefficients for obtaining the pixel value a1 are defined as follows.

$$-1, 0, 5, 8, 5, 0, -1 \quad (4)$$

These coefficients are obtained by generalizing the multi-rate filter of FIG. 4A corresponding to the 600-dpi resolution by inserting "0"s in the multi-rate filter coefficients to form a smoothing filter having half the pixel interval corresponding to the 1200-dpi resolution. The center value of the filter is "8", which corresponds to the total value of the coefficients of the multi-rate filter shown in FIG. 4A. This center value is used to conform to the division of a filter output by "8", such division being necessary in order to standardize the filter output.

In contrast, smoothing filter coefficients for obtaining the pixel value a1 according to the first embodiment are as follows.

$$1, 2, 1 \quad (5)$$

These coefficients are obtained by generalizing the filter of FIG. 3A corresponding to the 600-dpi resolution to form a smoothing filter having half the pixel interval corresponding to the 1200-dpi resolution. The center value of the filter is "2", which corresponds to the total value of the coefficients of the filter shown in FIG. 3A. This center value is used to conform to the division of a filter output by "2", such division being necessary in order to standardize the filter output.

The smoothing filter serves to remove excess frequency components that are generated by the insertion of "0"s. In comparison of the frequency characteristics of the filter (4) with those of the filter (5), the filter (4) can cut off the frequency components more steeply than the filter (5).

Figure 5:
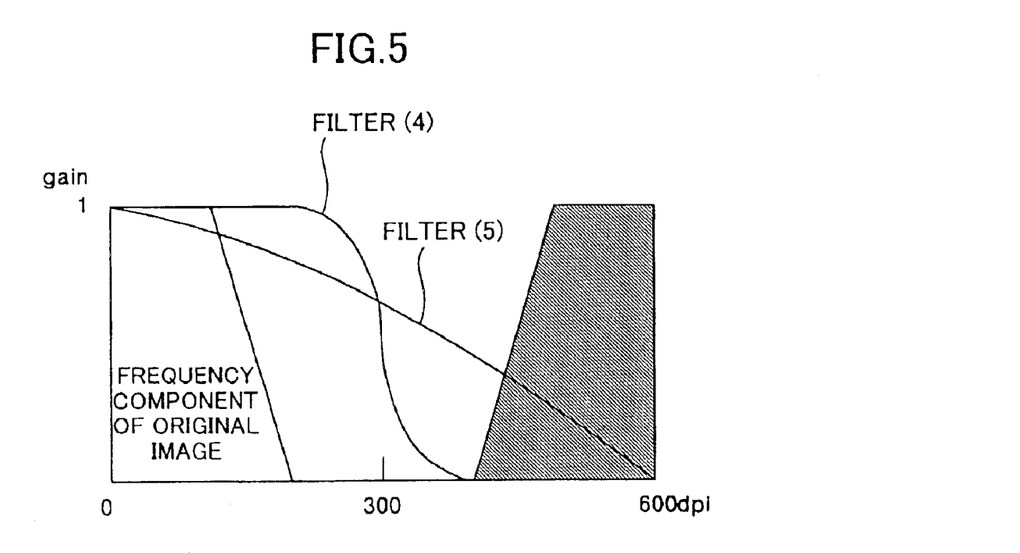
FIG. 5 is a chart for explaining the operation and frequency characteristics of the high-resolution conversion unit.

FIG. 5 is a chart for explaining the operation and frequency characteristics of the high-resolution conversion unit 103. In FIG. 5, the horizontal axis represents image resolution (dpi), and the vertical axis represents frequency characteristics (gain). The frequency characteristics of the filter (4) and the filter (5) are illustrated.

In terms of filter characteristics, the filter (4) is more idealistic. When actual image processing apparatus such as a scanner is used, however, images are degraded and blurred through the optical system, leaving almost no frequency components that reach the Nyquist frequency. Because of this, a filter having characteristics with a gentle slope such as the filter (5) can insure sufficient image quality for practical purposes, which was confirmed by experiment.

Accordingly, the use of simple filter coefficients shown in FIGS. 3A through 3C is sufficient in terms of image quality. The filter coefficients shown in FIGS. 3A through 3C are simple, and can be implemented through addition and shifting, thereby making it possible to reduce the amount of computation. Further, since reference in the sub-scan direction is made only with respect to an adjacent line, the size of line memories can also be reduced.

Figure 6:
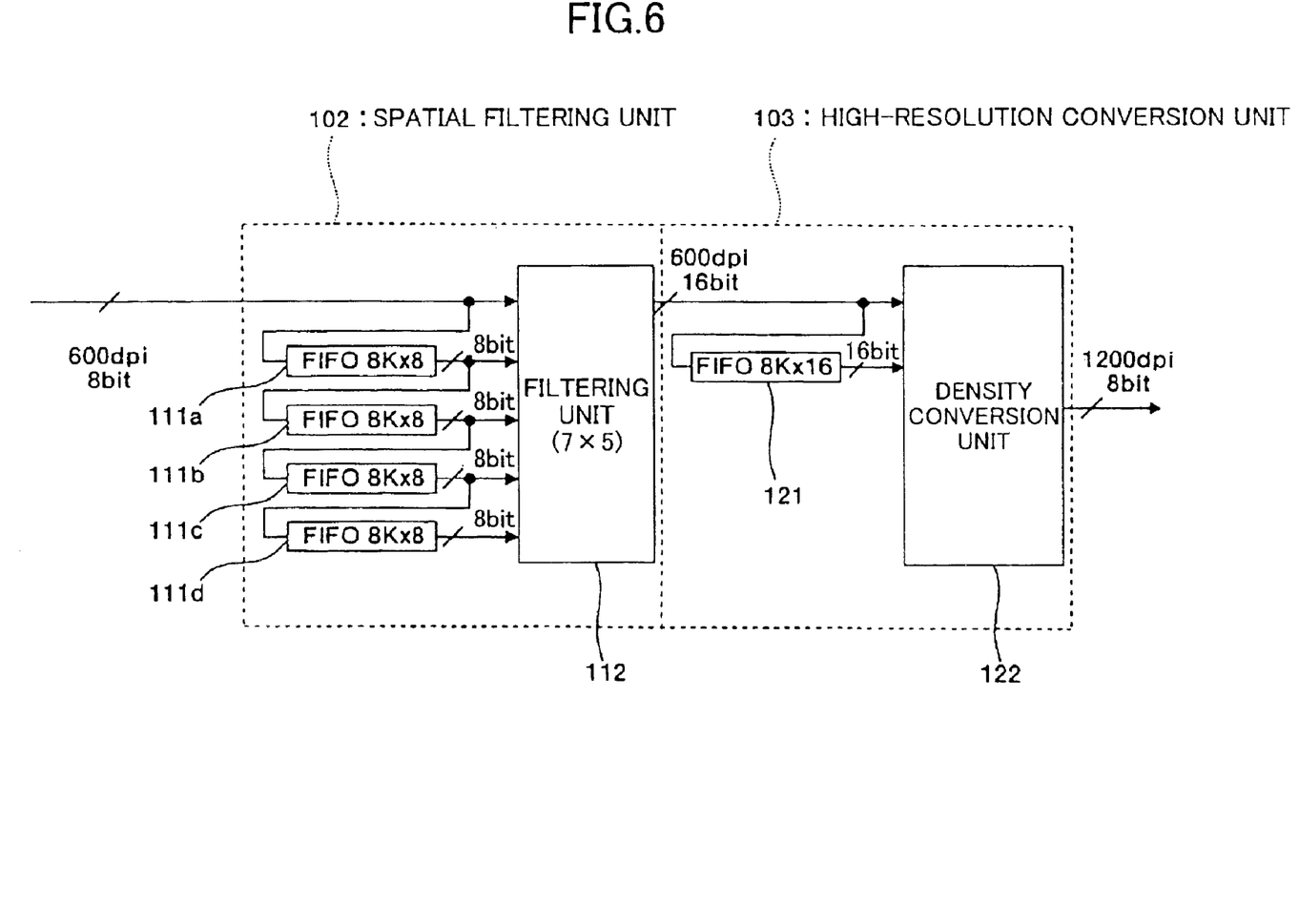
FIG. 6 is a block diagram showing an example of the construction of a spatial filtering unit and the high-resolution conversion unit shown in FIG. 1.

FIG. 6 is a block diagram showing an example of the construction of the spatial filtering unit 102 and the high-resolution conversion unit 103 shown in FIG. 1. The spatial filtering unit 102 includes four line delays (FIFO 8k×8) 111a through 111d corresponding to four horizontal lines, and further includes a filtering unit (7×5) 112 for performing 7-pixel-by-5-pixel filtering on image data. The high-resolution conversion unit 103 includes a line delay (FIFO 8k×16) 121 corresponding to one horizontal line, and further includes a density conversion unit 122.

In the example shown in FIG. 6, the filtering unit 112 carries out filtering on a 5-line-by-5-line basis in the sub-scan direction. As line delays for filtering purposes, thus, the line delays (FIFO 8k×8) 111a through 111c that are equal in amount to four lines become necessary. In the high-resolution conversion unit 103, the density conversion unit 122 converts 600-dpi image data into 1200-dpi image data as described in connection with FIGS. 3A through 3C, which requires the line delay (FIFO 8k×16) 121 that is equal in amount to one line.

Figure 7:
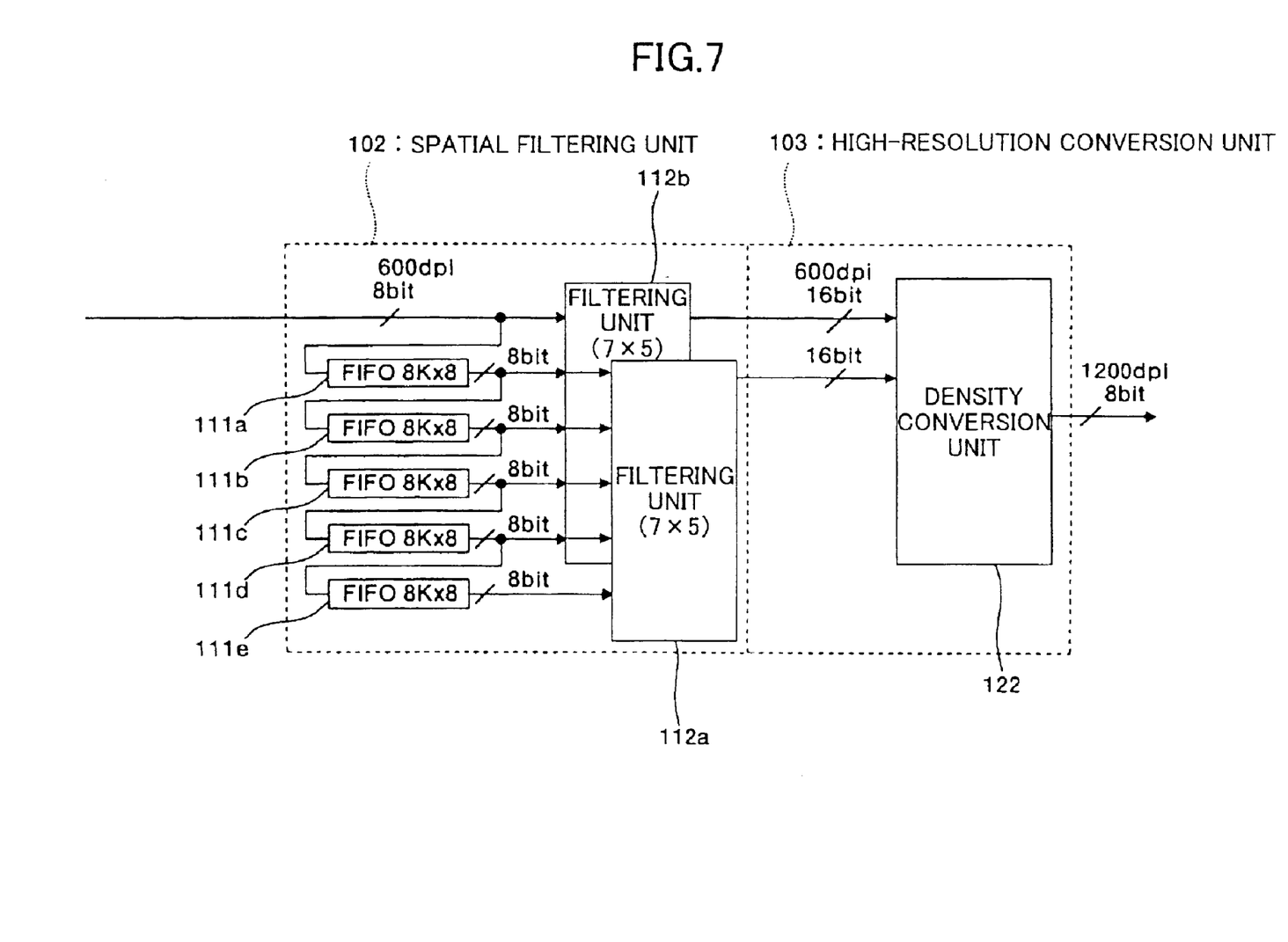
FIG. 7 is a block diagram showing another example of the construction of the spatial filtering unit and the high-resolution conversion unit shown in FIG. 1.

FIG. 7 is a block diagram showing another example of the construction of the spatial filtering unit 102 and the high-resolution conversion unit 103 shown in FIG. 1. The spatial filtering unit 102 includes five line delays (FIFO 8k×8) 111a through 111e and two filtering units (7×5) 112a and 112b for performing 7-pixel-by-5-pixel filtering on image data. The high-resolution conversion unit 103 includes the density conversion unit 122 that converts image data into high-resolution image data when the image data is supplied from the filtering units 112a and 112b.

In the construction shown in FIG. 7, unlike the case shown in FIG. 6, image data having been subjected filtering with a broader dynamic range is converted into high-resolution image data not by use of a line delay, but by use of a plurality of filtering operations that are performed concurrently on the 8-bit image data, part of which is delayed by a line delay before the filtering operation.

In the spatial filtering unit 102, the five line delays (FIFO 8k×8) 111a through 111e delay the 8-bit data prior to the filter operation. The filtering units 112a and 112b then perform filtering operations concurrently, and supply the respective image data to the density conversion unit 122 of the high-resolution conversion unit 103. At this time, the filtering unit 112b supplies filtered image data that is delayed relative to the image data of the filtering unit 112a in the sub-scan direction by such a line delay as necessary for the density conversion.

The density conversion unit 122 processes the 16-bit filtered data as described in connection with FIG. 2. With the construction shown in FIG. 7, the 1200-dpi generated data is the same as the data generated by the construction shown in FIG. 6. In comparison with the construction of FIG. 6, however, the construction of FIG. 7 has four FIFO memories (8k×k) that are one-memory fewer. Namely, in the construction of FIG. 6, the line delay (FIFO 8k×16) 121 is worth two FIFO memories having 8k-×-8 construction, resulting in the total of 6 line delays if the line delays (FIFO 8k×8) 111a through 111d are included. In the case of FIG. 7, on the other hand, only 5 FIFO (8k×8) memories are used, which is one-memory fewer than the number of FIFO (8k×8) memories used in the construction of FIG. 6.

The construction of FIG. 7 needs twice as much hardware for filtering (i.e., filtering unit) as needed for the construction of FIG. 6. However, the size of the filtering unit is significantly smaller than the size of a FIFO memory, so that the construction of FIG. 7 can maintain the same performance as that of FIG. 6 while reducing the amount of hardware in its entirety.

In this manner, the construction of FIG. 7 provides a plurality of filter circuits, which concurrently generate respective image data that are spaced apart in the sub-scan direction by such a number of lines as necessary for the conversion of image resolution. This reduces the size of FIFO memories that is necessary for the conversion of image resolution.

The construction of FIG. 7 can reduce the memory size compared with the construction of FIG. 6, but suffers a drawback in that the amount of computation increases. If the filtering computation is performed by hardware, no problem arises since the size of filter circuits are significantly smaller than the size of FIFO memories. If the filtering computation is carried out by a CPU or the like, however, an increase in the computation load will present a problem. In the construction of FIG. 7, therefore, the filter coefficients of the filtering units 112a and 112b may be defined as follows in order to reduce the amount of computation. In the following, for the sake of simplicity of explanation, a description will be given only with regard to filter coefficients of the filter in the sub-scan direction. FIGS. 8A through 8D are illustrative drawings for explaining an example of the filter coefficients used in the filtering units 112a and 112b.

Figure 8A:
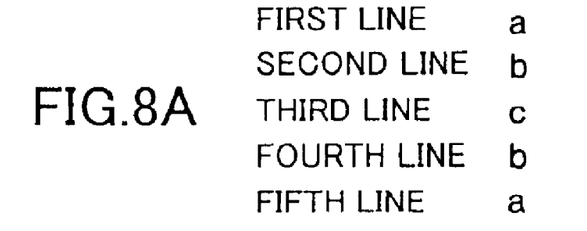
FIGS. 8A through 8D are illustrative drawings for explaining an example of filter coefficients used in a plurality of filtering units.
Figure 8B:
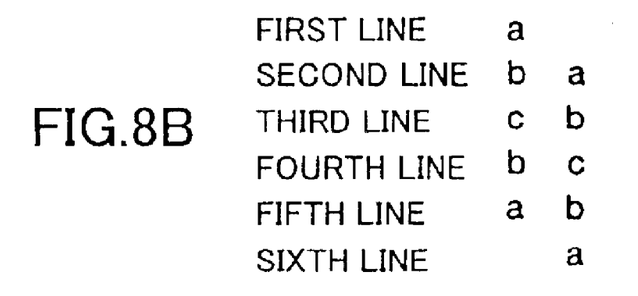

When the filter coefficients in the sub-scan direction are as shown in FIG. 8A (i.e., first line: a, second line: b, third line: c, fourth line: b, and fifth line: a), for example, computation as shown in FIG. 8B needs to be carried out in order to implement the construction of FIG. 7.

As for data on the second line, for example, multiplication by both the coefficient a and the coefficient b is necessary. In consideration of this, filter coefficients are selected in such a manner that a result of multiplication by a given coefficient will be obtained from a result of multiplication by another coefficient.

Figure 8C:
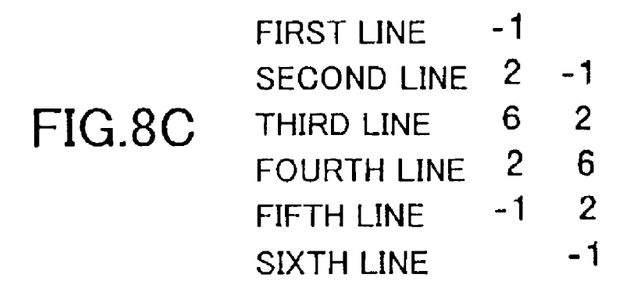

A further description will be given with reference to a more specific example. As shown in FIG. 8C, the filter coefficients a, b, and c are −1, 2, and 6, respectively, for example. As a result, the following multiplication is to be made with respect to each line: first line: −1; second line: 2; third line: 6; forth line: 2; and fifth line: −1. In addition, the following multiplication is to be further made with respect to each line: second line: −1; third line: 2; forth line: 6; fifth line: 2; and sixth line −1. Use of such filter coefficients makes it possible to perform the following operation. That is, when the results of multiplication by 2 and multiplication by 6 with respect to the data of the third line need to be obtained, the result of multiplication by 2 and the result of multiplication by 4 are retained, and are added together to produce a result of multiplication by 6. This significantly reduces the amount of computation. In this manner, filter coefficients are selected such that a result of a given calculation can be obtained from a result of another calculation with respect to the same data of the same line.

Figure 8D:
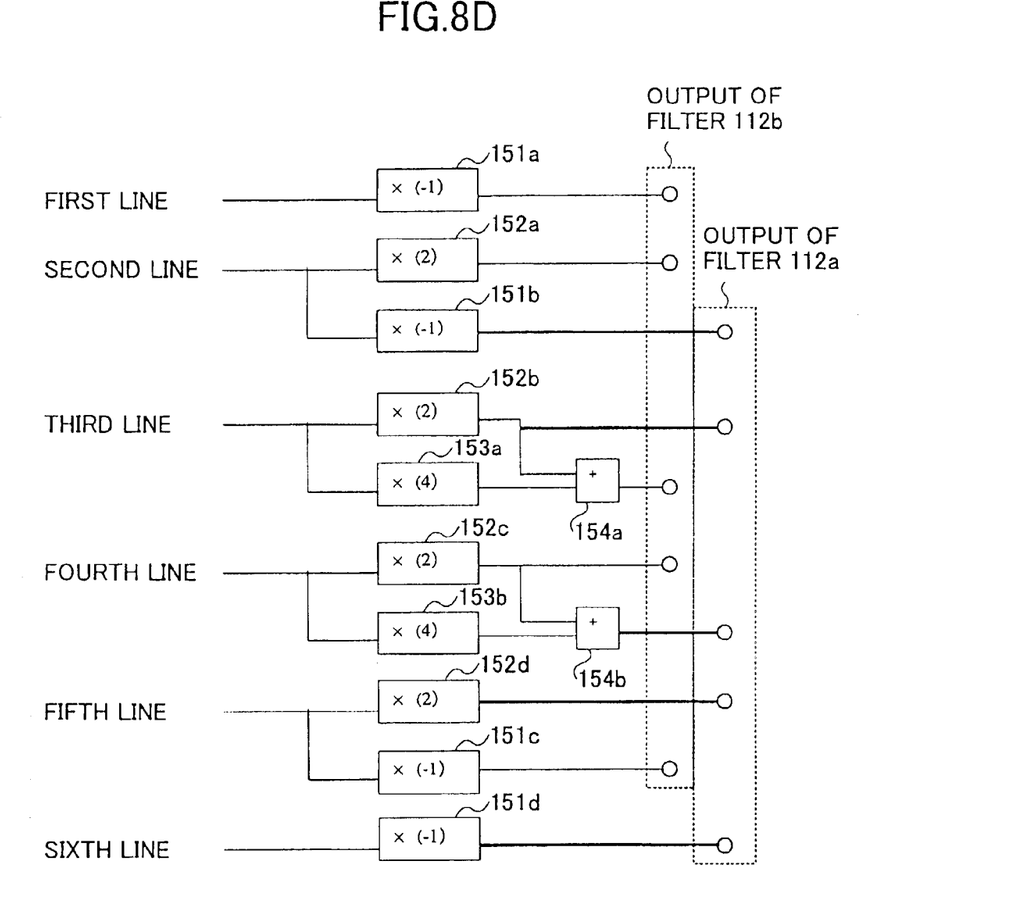

FIG. 8D is an illustrative drawing showing a construction that performs the filtering operation as described above. The construction shown in FIG. 8D includes inverting units 151a through 151d, multiplication-by-two operation unit 152a through 152d, multiplication-by-four operation units 153a through 153b, and adders 154a and 154b. When the data of the third line is to be multiplied by 2 and is to be multiplied by 6, the multiplication-by-two operation unit 152b multiplies the data of the third line by 2, the result of which is output from the filtering unit 112a. Further, the multiplication-by-four operation unit 153 multiplies the data of the third line by 4. The result of multiplication by 2 and the result of multiplication by 4 are added together by the adder 154a, thereby generating an output of the filtering unit 112b.

In this manner, when a plurality of filter coefficients are operated on the same single line, the filter coefficients are selected such that a result of calculation based on a given filter coefficient can be obtained from a result of calculation based on another filter coefficient. This allows a plurality of filtering units to operate concurrently without having a proportionate increase in the amount of processing in commensurate with the number of filtering units. Accordingly, it is possible to achieve high speed processing by efficient computation when a CPU or the like performs filtering. Even when filtering is performed by dedicated hardware, an advantageous effect is obtained in that the size of circuitry is reduced. Especially, if provision is made to use only multiplication by $2^n$ (n: integer) for filtering operation, shift operations are all that is necessary. This achieves efficient processing.

According to the first embodiment as described above, the input unit 101 scans image data, and the spatial filtering unit 102 performs spatial filtering on the image data supplied form the input unit 101 such as to provide a broader dynamic range. The high-resolution conversion unit 103 interpolates the image data processed by the spatial filtering unit 102 to convert the image data into high-resolution image data, followed by limiting the dynamic range. As a result, moiré is suppressed even when the moiré is generated by interference between the intervals of screen dots of the original document and the sampling interval used for obtaining pixel values at the time of image scans, or even when the moiré is generated by non-linear processing such as data saturation during spatial filtering or strong gamma processing. Further, when the image data is interpolated to generate high-resolution image data, two pixels adjacent in the main scan direction are averaged for use in interpolation regarding the main scan direction, and two pixels adjacent in the sub-scan direction are averaged for use in interpolation regarding the sub-scan direction. Further, four pixels surrounding a pixel of interest are averaged for use in interpolation regarding a diagonal direction. With this provision, it is possible to reduce the amount of computation required for the conversion of image resolution, and also to reduce the number of FIFO memories used for the conversion of image resolution. Accordingly, hardware having a small configuration achieves both the prevention of moiré and the generation of high-quality letter images.

Second Embodiment

Figure 9:
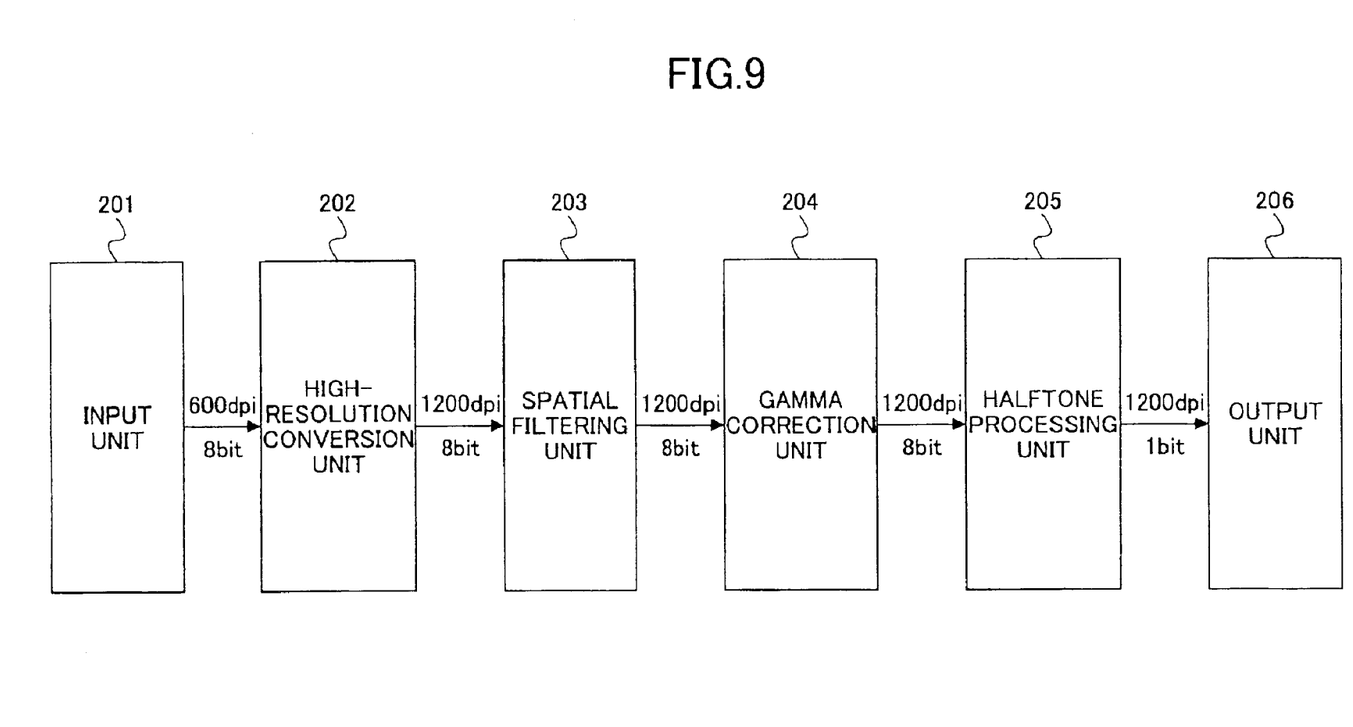
FIG. 9 is a block diagram showing a schematic construction of the image processing apparatus according to a second embodiment of the present invention.

FIG. 9 is a block diagram showing a schematic construction of the image processing apparatus according to a second embodiment of the present invention.

The image processing apparatus of FIG. 9 includes an input unit 201, a high-resolution conversion unit 202, a spatial filtering unit 203, a gamma correction unit 204, a halftone processing unit 205, and an output unit 206. The input unit 201 may be a scanner or the like, and obtains image data by scanning a document. The high-resolution conversion unit 202 changes image resolution to higher image resolution by interpolating the image data obtained by the input unit 201. The spatial filtering unit 203 applies spatial filtering to the image data supplied from the high-resolution conversion unit 202. The gamma correction unit 204 applies gamma correction to the image data supplied from the spatial filtering unit 203.

The input unit 201 includes a 600-dpi/8-bit scanner. The input unit 201 scans the image data of a document, and supplies 600-dpi/8-bit image data to the high-resolution conversion unit 202.

The high-resolution conversion unit 202 converts image resolution into higher image resolution with respect to the 600-dpi/8-bit image data supplied from the input unit 201, followed by supplying 1200-dpi/8-bit image data to the spatial filtering unit 203. The high-resolution conversion unit 202 performs the same interpolation as that performed by the high-resolution conversion unit 103 of the first embodiment.

As previously described, moiré caused by non-linear processing is generated by interference between aliasing error components and the sampling interval. When the image data is converted into high-resolution image data through interpolation as described above, an effect that is equivalent to that of the shortening of a sampling interval is obtained. As a result, the effect of aliasing errors in the frequency domain is diminished even when harmonics are generated. If image data is converted into high-resolution image data, therefore, application of non-linear processing such as filtering with data saturation will not cause much detrimental effects attributable to aliasing errors resulting from the generated harmonics.

The spatial filtering unit 203 applies spatial filtering to the 1200-dpi/8-bit image data supplied from the high-resolution conversion unit 202. The spatial filtering unit 203 then supplies 1200-dpi/8-bit image data to the gamma correction unit 204.

The gamma correction unit 204 applies gamma conversion to the 1200-dpi/8-bit image data supplied from the spatial filtering unit 203, and supplies the 1200-dpi/8-bit image data to the halftone processing unit 205.

The halftone processing unit 205 performs halftone processing on the 1200-dpi/8-bit image data transferred from the gamma correction unit 204 so as to binarize the image data, thereby providing 1200-dpi/1-bit image data to the output unit 206. Although binarization is employed in this example, conversion into multi-value data may alternatively be performed.

The output unit 206 includes a printer unit, and prints the 1200-dpi/1-bit image data on a paper sheet when the image data is supplied from the halftone processing unit 205.

According to the second embodiment as described above, the input unit 201 scans image data, and the high-resolution conversion unit 202 interpolates the image data supplied form the input unit 201 to convert image resolution to higher image resolution. The spatial filtering unit 203 applies spatial filtering to the image data that has undergone image-resolution conversion by the high-resolution conversion unit 202. As a result, moiré is suppressed even when the moiré is generated by interference between the intervals of screen dots of the original document and the sampling interval used for obtaining pixel values at the time of image scans, or even when the moiré is generated by non-linear processing such as data saturation during spatial filtering or strong gamma processing. Further, when the image data is interpolated to generate high-resolution image data, two pixels adjacent in the main scan direction are averaged for use in interpolation regarding the main scan direction, and two pixels adjacent in the sub-scan direction are averaged for use in interpolation regarding the sub-scan direction. Further, four pixels surrounding a pixel of interest are averaged for use in interpolation regarding a diagonal direction. With this provision, it is possible to reduce the amount of computation required for the conversion of image resolution, and also to reduce the number of FIFO memories used for the conversion of image resolution. Accordingly, hardware having a small configuration achieves both the prevention of moiré and the generation of high-quality letter images.

Third Embodiment

Figure 10:
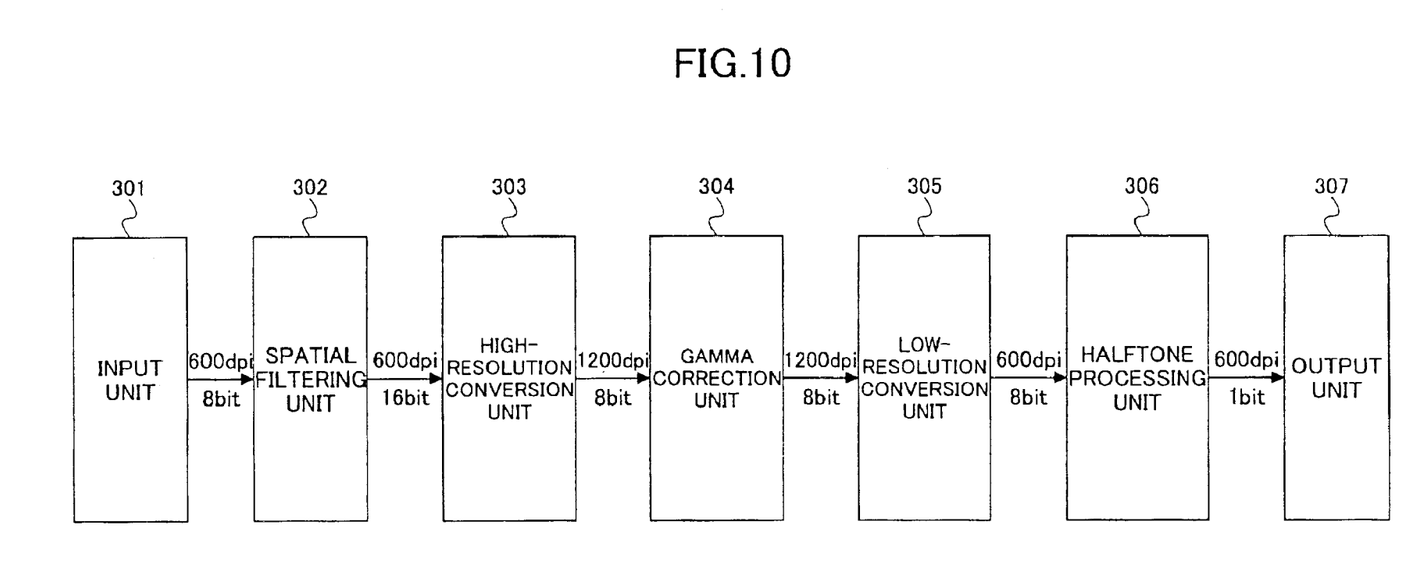
FIG. 10 is a block diagram showing a schematic construction of the image processing apparatus according to a third embodiment of the present invention.

FIG. 10 is a block diagram showing a schematic construction of the image processing apparatus according to a third embodiment of the present invention.

The image processing apparatus of FIG. 1 includes an input unit 301, a spatial filtering unit 302, a high-resolution conversion unit 303, a gamma correction unit 304, a low-resolution conversion unit 305, a halftone processing unit 306, and an output unit 307. The input unit 301 may be a scanner, and obtains image data by scanning a document. The spatial filtering unit 302 applies spatial filtering to the image data such that the spatial filtering provides a broader dynamic range. The high-resolution conversion unit 303 changes image resolution to higher image resolution by interpolating the image data processed by the spatial filtering unit 302. The gamma correction unit 304 applies gamma correction to the image data that is given higher resolution by the high-resolution conversion unit 303. The low-resolution conversion unit 305 converts high image resolution into low image resolution with respect to the image data that has undergone gamma correction by the gamma correction unit 304.

The input unit 301 includes a 600-dpi/8-bit scanner. The input unit 301 scans the image data of a document, and supplies 600-dpi/8-bit image data to the spatial filtering unit 302.

The spatial filtering unit 302 applies spatial filtering to the 600-dpi/8-bit image data supplied from the input unit 301 such that the spatial filtering provides a broader dynamic range for output values (16 bits) than for input values (8 bits). The spatial filtering unit 302 thus supplies 600-dpi/16-bit image data to the high-resolution conversion unit 303.

The high-resolution conversion unit 303 changes image resolution and restricts the dynamic range with respect to the 600-dpi/16-bit image data supplied from the spatial filtering unit 302. As a result, the high-resolution conversion unit 303 supplies 1200-dpi/8-bit image data to the gamma correction unit 304.

The spatial filtering unit 302 and the high-resolution conversion unit 303 may have the same constructions as the spatial filtering unit 102 and the high-resolution conversion unit 103, respectively, of the first embodiment.

The gamma correction unit 304 applies gamma conversion to the 1200-dpi/8-bit image data supplied from the high-resolution conversion unit 303, and supplies the 1200-dpi/8-bit image data to the low-resolution conversion unit 305.

The low-resolution conversion unit 305 converts image resolution into lower image resolution with respect to the 1200-dpi/8-bit image data supplied from the gamma correction unit 304, thereby supplying 600-dpi/8-bit image data to the halftone processing unit 306. Since high frequency components are unnecessary and undesirably cause moiré, it is preferable to apply a smoothing filter that cuts off high frequency components prior to the conversion of image resolution into lower image resolution. The filter (4) shown in FIG. 5 would be best suited for this purpose. In practice, however, the filter (5) produces almost the same image quality in output images. As previously described, the filter (5) (i.e., the filters shown in FIGS. 3A through 3C) has simple filter coefficients, and requires only addition and shift operations. Further, reference in the sub-scan direction is only made to a next adjacent line. Accordingly, the use of such a filter has an advantage in that the amount of line memories can be reduced.

The halftone processing unit 306 performs halftone processing on the 600-dpi/8-bit image data transferred from the low-resolution conversion unit 305 so as to binarize the image data, thereby providing 600-dpi/1-bit image data to the output unit 307. Although binarization is employed in this example, conversion into multi-value data may alternatively be performed.

The output unit 307 includes a printer unit, and prints the 600-dpi/1-bit image data on a paper sheet when the image data is supplied from the halftone processing unit 306.

According to the third embodiment as described above, the input unit 301 scans image data, and the spatial filtering unit 302 performs spatial filtering on the image data supplied from the input unit 301 such as to provide a broader dynamic range. The high-resolution conversion unit 303 interpolates the image data processed by the spatial filtering unit 302 to convert the image data into high-resolution image data, followed by limiting the dynamic range. Further, the low-resolution conversion unit 305 converts the high-resolution image data into low-resolution image data. As a result, moiré is suppressed even when the moiré is generated by interference between the intervals of screen dots of the original document and the sampling interval used for obtaining pixel values at the time of image scans, or even when the moiré is generated by non-linear processing such as data saturation during spatial filtering or strong gamma processing. Further, when the image data is interpolated to generate high-resolution image data, or when filtering is applied prior to the conversion of image resolution into lower image resolution, two pixels adjacent in the main scan direction are averaged for use in interpolation regarding the main scan direction, and two pixels adjacent in the sub-scan direction are averaged for use in interpolation regarding the sub-scan direction. Further, four pixels surrounding a pixel of interest are averaged for use in interpolation regarding a diagonal direction. With this provision, it is possible to reduce the amount of computation required for the conversion of image resolution, and also to reduce the number of FIFO memories used for the conversion of image resolution. Accordingly, hardware having a small configuration achieves both the prevention of moiré and the generation of high-quality letter images.

Further, the present invention is not limited to these embodiments, but various variations and modifications may be made without departing from the scope of the present invention.

What is claimed is:

1. An image processing apparatus, comprising
a spatial filtering unit which applies spatial filtering to input image data to generate filtered image data such that said spatial filtering provides a broader dynamic range for outputs than for inputs; and
a high-resolution conversion unit which interpolates the filtered image data in a first direction by an average of values of two pixels adjacent in the first direction, in a second direction perpendicular to the first direction by an average of values of two pixels adjacent in the second direction, and in a direction diagonal to the first and second directions by an average of four pixels surrounding a pixel of interest, thereby converting the filtered image data into high-resolution image data.

2. The image processing apparatus as claimed in claim 1, further comprising:

a unit which limits the dynamic range of the high-resolution image data; and
a low-resolution conversion unit which converts the high-resolution image data having the limited dynamic range into low-resolution image data.

3. The image processing apparatus as claimed in claim 2, wherein said low-resolution conversion unit filters the high-resolution image data having the limited dynamic range in the first direction by an average of values of two pixels adjacent in the first direction, in the second direction by an average of values of two pixels adjacent in the second direction, and in the diagonal direction by an average of four pixels surrounding a pixel of interest, thereby cutting off high-frequency components of the high-resolution image data having the limited dynamic range prior to the conversion of the high-resolution image data having the limited dynamic range into the low-resolution image data.

4. The image processing apparatus as claimed in claim 1, wherein said spatial filtering unit includes a plurality of filter circuits, said plurality of filter circuits applying spatial filtering concurrently to a plurality of lines of the input image data, so as to generate a plurality of the filtered image data concurrently that are spaced apart in the second direction by a predetermined number of lines, said plurality of the filtered image data being supplied to the high-resolution conversion unit.

5. The image processing apparatus as claimed in claim 4, wherein a first filter circuit of said plurality of filter circuits multiplies a line of the input image data by a first filter coefficient, and a second filter circuit of said plurality of filter circuits multiplies the line of the input image data by a second filter coefficient by utilizing a result of the multiplication by said first filter circuit.

6. The information processing apparatus as claimed in claim 1, implemented as a board having a semiconductor integrated circuit mounted thereon, said semiconductor integrated circuit implementing said spatial filtering unit and said high-resolution conversion unit.

7. An information processing apparatus, comprising
an input unit which optically scans a document to generate input image data;
a spatial filtering unit which applies spatial filtering to the input image data to generate filtered image data such that said spatial filtering provides a broader dynamic range for outputs than for inputs;
a high-resolution conversion unit which interpolates the filtered image data in a first direction by an average of values of two pixels adjacent in the first direction, in a second direction perpendicular to the first direction by an average of values of two pixels adjacent in the second direction, and in a direction diagonal to the first and second directions by an average of four pixels surrounding a pixel of interest, thereby converting the filtered image data into high-resolution image data, followed by limiting the dynamic range of the high-resolution image data; and
an output unit which prints, on a paper sheet, image data that has undergone predetermined processing after being output from said high-resolution conversion unit.

8. An image processing apparatus, comprising:
a high-resolution conversion unit which interpolates input image data in a first direction by an average of values of two pixels adjacent in the first direction, in a second direction perpendicular to the first direction by an average of values of two pixels adjacent in the second direction, and in a direction diagonal to the first and second directions by an average of four pixels surrounding a pixel of interest, thereby converting the input image data into high-resolution image data; and a spatial filtering unit which applies spatial filtering to the high-resolution image data.

9. A method of processing an image, comprising the steps of:

applying spatial filtering to input image data to generate filtered image data such that said spatial filtering provides a broader dynamic range for outputs than for inputs; and interpolating the filtered image data in a first direction by an average of values of two pixels adjacent in the first direction, in a second direction perpendicular to the first direction by an average of values of two pixels adjacent in the second direction, and in a direction diagonal to the first and second directions by an average of four pixels surrounding a pixel of interest, thereby converting the filtered image data into high-resolution image data.

10. The method as claimed in claim 9, further comprising the steps of:

limiting the dynamic range of the high-resolution image data; and converting the high-resolution image data having the limited dynamic range into low-resolution image data.

11. The method as claimed in claim 10, wherein said step of converting the high-resolution image data having the limited dynamic range into low-resolution image data includes filtering the high-resolution image data having the limited dynamic range in the first direction by an average of values of two pixels adjacent in the first direction, in the second direction by an average of values of two pixels adjacent in the second direction, and in the diagonal direction by an average of four pixels surrounding a pixel of interest, thereby cutting off high-frequency components of the high-resolution image data having the limited dynamic range prior to the conversion of the high-resolution image data having the limited dynamic range into the low-resolution image data.

* * * * *